R. G. HOLMES & W. H. BUTLER.
LOCK.
No. 13,722.  Patented Oct. 30, 1855.
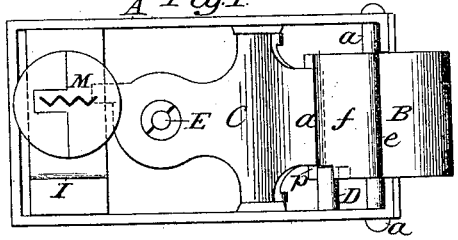
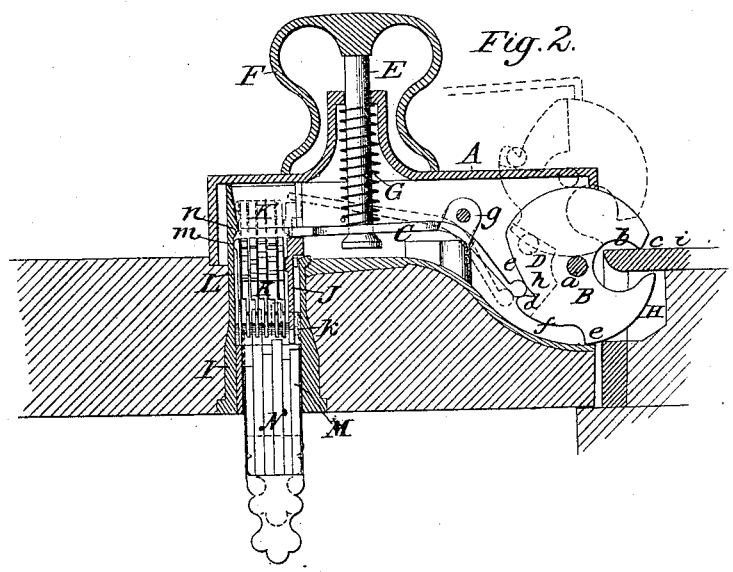
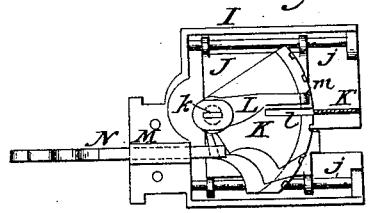

UNITED STATES PATENT OFFICE.

RICHARD G. HOLMES AND WM. H. BUTLER, OF NEW YORK, N. Y.

LOCK.

Specification of Letters Patent No. 13,722, dated October 30, 1855.

*To all whom it may concern:*

Be it known that we, R. G. HOLMES and W. H. BUTLER, of the city, county, and State of New York, have invented a new and Improved Lock for Safe, Bank, Vault, and other Doors; and we do hereby declare that the following is a full, clear, and exact description of the same, reference being had to the annexed drawings, forming a part of this specification, in which,—

Figure 1, is a view of the interior of our improvement, the side of the casing nearest the eye being removed. Fig. 2, is a horizontal section of the casing of the lock, the working parts not being bisected. Fig. 3, is a detached side view of the tumblers and sliding plate.

Similar letters of reference indicate corresponding parts in the several figures.

The nature of our invention consists,—

1st. In having the arbor of the lock so arranged in relation with the bolt, that the bolt may be operated by drawing and pushing the arbor in and out, or by moving and sliding the arbor, without turning it, in a direction transversely with the bolt, as will be presently shown and described.

2nd. Our invention consists in the peculiar construction of the bolt and also in the peculiar way in which it is arranged and connected with the arbor so as to be operated by it.

3rd. Our invention consists in the employment or use of a series of sector tumblers attached to a sliding plate and arranged with a spring, as will be presently shown and described, whereby the moving or adjusting of a single tumbler is prevented and the lock rendered unpickable.

To enable others skilled in the art to fully understand and construct our invention, we will proceed to describe it.

A, Figs. 1 and 2, represents the casing of the lock, and B, represents the bolt which is of cylindrical form and works upon pivots or an axis (*a*) at one end of the casing. Nearly one half of the cylindrical bolt projects beyond the end of the casing and in this half a longitudinal circular recess (*b*), is made and a longitudinal slot (*c*) is made in the edge of the cylinder, which communicates with the recess (*b*), see Fig. 2. The side of the cylindrical bolt within the casing A, has two longitudinal shoulders (*d*), (*e*), formed on its edge or periphery by recesses (*e*), (*f*) in the periphery of the cylindrical bolt, the recess (*e*), is nearly straight transversely and passes sufficiently inward or toward the axis of the cylinder to form the necessary shoulder (*d*) while the other recess (*e*) is transversely of curved cymatium form, as clearly shown in Fig. 2.

C, represents a lever placed within the casing A. This lever is formed of a metal plate the outer end of which bears against the periphery of the cylindrical bolt within the casing A. The lever C, works upon pivots (*g*), which serve as fulcra, said pivots passing through the top and bottom plates of the casing.

D, is a stop attached to the lower plate of the casing said top fitting in a recess (*h*), in the lower part of the cylindrical bolt, see Fig. 1, and dotted lines in Fig. 2.

E, represents the arbor or spindle of the lock, to which arbor the knob F, is attached. The arbor passes through the inner side of the casing and is attached to the inner side of the lever C. The arbor has a spiral spring G, placed around it, said spring keeping the outer edge of the lever C, against the periphery of the cylindrical bolt B, and the inner end of the knob F, against the side of the casing, see Fig. 2.

H, represents a recess made in the casing or side piece of the door to receive the portion of the cylindrical bolt. The outer side of this recess is a metal plate (*i*), which, when the lock is in a locked state, fits in the recess (*b*), in the bolt B, see Fig. 2.

We will now proceed to describe the operation of the bolt. When the parts are in the position as shown in Fig. 2, the lock is in a locked state, as the plate (*i*) is in the recess (*b*) of the cylindrical bolt and the outer end of the lever C, bears against the shoulder (*d*) and prevents the cylindrical bolt from turning. In order to unlock the lock, the knob F, is drawn outward from the casing and the inner end of the lever C, is drawn toward the side of the casing A, and the outer edge of the plate C, will consequently be thrown free from the shoulder (*d*) on the cylindrical bolt, which will then turn as the knob and door are pulled toward the operator and the cylindrical bolt is allowed to pass out of the recess H, in the casing, the outer edge of the lever bearing upon the curved recess (*f*), and tending to turn the cylinder B. The knob F, of course is supposed to be on the inner side of the door.

I, represents a box or casing attached to one end of the casing A. Within the box or casing I, there is a sliding plate J, which works on guide rods (*j*), (*j*), see Fig. 3, said plate J, being in a vertical position. To the front end of the sliding plate there is attached an arm (*k*) on which a series of sector tumblers K, are fitted, the sector tumblers being placed loosely on the arm. Each sector has a slot (*l*) cut in its periphery or face, the slots in the several tumblers being cut in them at varying distances. The peripheries of the tumblers are toothed, see Fig. 3. To the inner end of the box or casing I, there is attached a horizontal plate K', sufficiently thin to enter the slots (*l*), in the tumblers. This plate is permanently attached to the box or casing.

L, is a spring, the inner end of which is fitted upon the end of the arm (*k*), on which the sector tumblers are fitted. The outer end of the spring L, has a projection (*m*) upon its side. The length of the spring is equal to the length of the tumblers or is of the same radius. To the inner surface of one of the sides of the box or casing I, there is a beveled or inclined projection (*n*) see Fig. 2.

M, is the key hole of the lock at the front end of the box or casing I, and N, Figs. 2 and 3, is the key.

The inner end of the lever C, fits in a slot in one side of the box or casing I, directly in front of the sliding plate J, the end of the spring being pressed against the sliding plate by the spring G.

In order to unlock the lock at the outer side of the door, the inner end of the lever C, is operated by pressing the sliding plate J, against it, and in order to do this, the sector tumblers K, must all be turned or moved upon their axis (*k*) till the slots (*l*) in the several tumblers are brought in line with each other and directly opposite the plate K, so that the tumblers and plate may be shoved inward, the plate K, fitting in the slots. This is done by a key N, having bits of varying lengths corresponding to the different positions of the slots (*l*).

In order to prevents the lock being picked, the spring L, is employed. This spring, when the sliding plate J, and tumblers K, are shoved inward, will be pressed against the side of the tumbler adjoining it and will cause the several tumblers to be pressed together and bear against each other so that one cannot be moved on its axis (*k*), separately, but will cause two or more of the tumblers to be moved with it. The tumblers are pressed together by the spring before the tumblers reach the plate K'.

By this arrangement, a burglar cannot operate singly upon the tumblers because he cannot get the faces of the tumblers against the plate K', without binding them together and therefore causing two or more of the tumblers to move together. Hence the picking of the lock by ascertaining the positions of the several slots (*l*), in the tumblers, by obtaining a pressure of the tumblers against the plate K', is rendered impossible.

The above invention is extremely simple, not liable to get out of repair and is burglar and powder proof. If the lock is applied to the front doors of dwellings, no delay is occasioned in opening the door in consequence of turning the knob and the various difficulties that arise in consequence of the mechanism required to withdraw the bolt, by turning the knob. The invention may be advantageously applied to all doors.

Having thus described our invention, what we claim as new and desire to secure by Letters Patent, is,

1. Arranging the spindle or arbor E, of the lock, in such a relation with the bolt, that the bolt may be operated by drawing and pressing the spindle or arbor in a direction transversely with the casing of the lock, substantially as described.

2. We claim the cylindrical bolt B, constructed and arranged substantially as shown and also connecting said bolt to the spindle or arbor E, by means of the lever C, as described.

3. We claim the employment or use of the sector tumblers K, when attached to a sliding plate J, and used in connection with a spring L, which is acted upon by the beveled or inclined projection (*n*) at the side of the box or casing I, for the purpose of preventing the lock being picked by obtaining a knowledge of the position of the slots (*l*) in the tumblers by pressing the tumblers singly against the plate K', as herein described.

R. G. HOLMES.
WILLIAM H. BUTLER.

Witnesses:
Wm. Hibbard,
Wm. M. Miller.